No. 670,323. Patented Mar. 19, 1901.
W. J. KENNEDY.
WHIP SOCKET ATTACHMENT.
(Application filed Dec. 1, 1900.)

(No Model.)

Witnesses
T. P. Britt
Clauner Shaw

Inventor
W. J. Kennedy,
O'Meara & Co
Attorneys

UNITED STATES PATENT OFFICE.

WILLIAM JOHN KENNEDY, OF WEST RUTLAND, VERMONT.

WHIP-SOCKET ATTACHMENT.

SPECIFICATION forming part of Letters Patent No. 670,323, dated March 19, 1901.

Application filed December 1, 1900. Serial No. 38,355. (No model.)

*To all whom it may concern:*

Be it known that I, WILLIAM JOHN KENNEDY, a citizen of the United States, residing at West Rutland, in the county of Rutland and State of Vermont, have invented a new and useful Whip-Socket Attachment, of which the following is a specification.

This invention relates to whip-socket attachments; and the object is to provide a simple attaching means for whip-sockets whereby the latter may be readily applied to some convenient portion of the vehicle or implement and adjusted to support the whip at the desired angle, the attachment being more especially designed for attaching sockets to the metal seats of harvesting implements.

With the above object in view the invention consists in the novel features of construction hereinafter fully described, particularly pointed out in the claims, and clearly illustrated by the accompanying drawings, in which—

Figure 1:
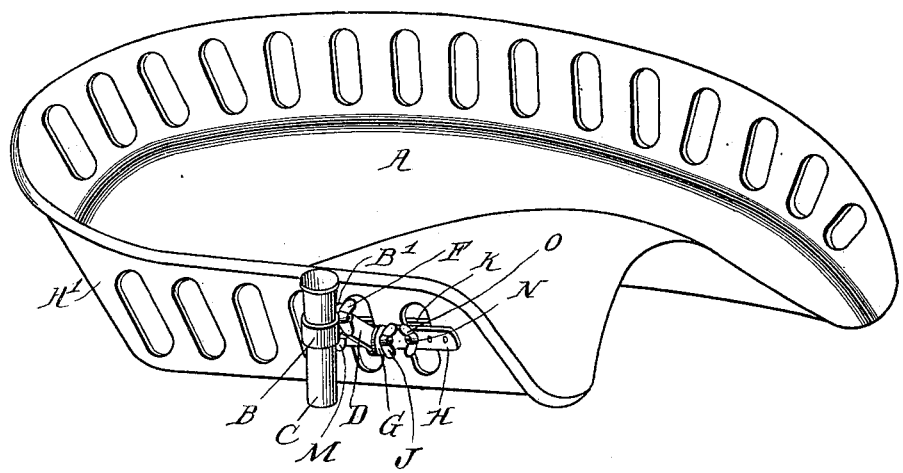
Figure 2:
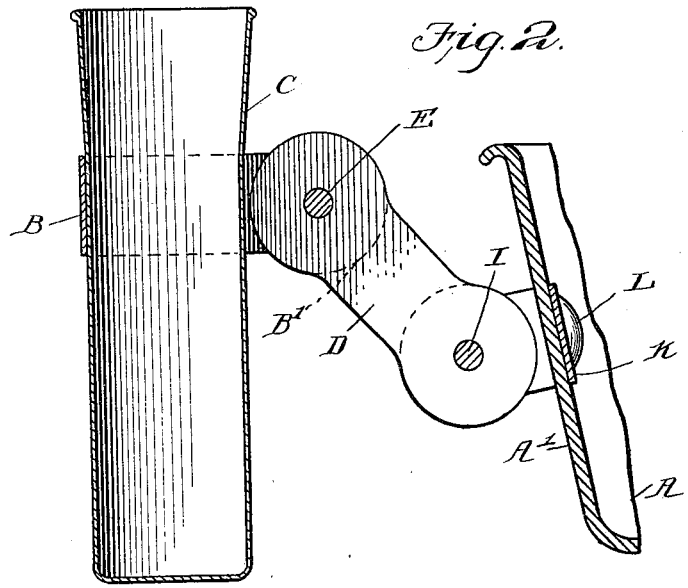

Figure 1 is a perspective view showing my invention in operative position; and Fig. 2, a longitudinal sectional view through the attachment, socket, and a portion of the seat to which it is applied.

Referring now more particularly to the accompanying drawings, A designates the seat of a harvesting implement, which is formed concave, as is usual in iron seats of this character, and thus having side portions A', which are formed with slots for the purpose of reducing the weight of the seat.

My attachment consists of a pivoted loop B, designed to embrace the socket C, to which it is secured in any preferred manner. This loop is formed with two ears B', receiving therebetween an arm D, which is pivoted thereto by a bolt E, having a thumb-nut F. The opposite end of said arm is pivotally secured between ears G, formed on an attaching-plate H by means of a bolt I and a thumb-nut J. Said attaching-plate H is formed near one end with a perforation and at its opposite end with a plurality of alined perforations. Said plate is positioned upon the outer side of the slotted side portion of the seat, and positioned upon the inner side thereof is a second attaching-plate K, formed also at one end with a perforation and at its opposite end with a series of alined perforations. A bolt L is passed through the perforations at one end of the two plates and through one of the slots in the seat, receiving a thumb-nut M, whereby the two plates are securely fixed to the seat at that end. A bolt N is passed through any one of the series of perforations at the opposite ends of the plates that coincide with one of the slots of the seats and receives a thumb-nut O for the purpose of clamping the two plates at that end.

After the attachment has been secured in position upon the seat the swinging arm and loop are adjusted to support the socket at the desired angle with relation to the seat and said parts then locked in that adjustment by the thumb-nuts.

From the above description it will be seen that I have produced a very simple and convenient attaching means for the purpose of attaching a whip-socket to a vehicle or harvesting implement and adjusting the socket to the desired angle and securing the same in its adjustment.

Having thus fully described my invention, what I claim as new, and desire to secure by Letters Patent, is—

1. An attaching device for whip-sockets comprising an attaching-plate, means for securing said plate in position, an arm pivoted to said plate, clamping means for said arm, a band to embrace the socket, pivotally secured to the opposite end of said arm, and means for clamping said band in its adjustment, substantially as described.

2. The combination with a perforated support, of attaching-plates positioned on opposite sides of said support, and formed with perforations in line with the perforations thereof, bolts passing through the perforations of the attaching-plates and the support, clamping-nuts for said bolts, an arm pivoted to one of said plates, means for clamping said arm in its adjustment, a band designed to support the socket, pivoted to said arm, and means for clamping said band in its adjustment, substantially as described.

3. The combination with a support formed with a series of openings, of attaching-plates positioned on the respective sides of said support and formed at one end with a perforation designed to be placed in coincidence with one of the openings of the support, and provided at their opposite ends with a series of perforations, a bolt passing through the perforations at one end of the plates and the perforation of the support in coincidence therewith, a bolt passing through another perforation of the support and through one of the series of perforations in each of the plates at their opposite ends, clamping-nuts for said bolts, an arm pivoted to one of said plates, clamping means for locking said arm from movement, a socket-support pivoted to said arm, and clamping means for locking said support from movement, substantially as described.

WILLIAM JOHN KENNEDY.

Witnesses:
J. D. RYAN,
FRED LAUTHIUS.